(12) United States Patent
Kim et al.

(10) Patent No.: US 11,170,110 B2
(45) Date of Patent: Nov. 9, 2021

(54) MEMORY SYSTEM AND OPERATION METHOD THEREOF

(71) Applicant: SK hynix Inc., Gyeonggi-do (KR)

(72) Inventors: Ki-Sung Kim, Gyeonggi-do (KR); Yong-Sang Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 252 days.

(21) Appl. No.: 16/409,263

(22) Filed: May 10, 2019

(65) Prior Publication Data

US 2020/0089889 A1    Mar. 19, 2020

(30) Foreign Application Priority Data

Sep. 19, 2018    (KR) .................... 10-2018-0112170

(51) Int. Cl.
  G06F 21/57         (2013.01)
(52) U.S. Cl.
  CPC .......... *G06F 21/575* (2013.01); *G06F 21/572* (2013.01)
(58) Field of Classification Search
  CPC ...... G06F 21/572; G06F 21/575; G06F 21/62; G06F 21/64
  See application file for complete search history.

(56) References Cited

U.S. PATENT DOCUMENTS

| | | | |
|---|---|---|---|
| 7,600,062 B2 | 10/2009 | Su et al. | |
| 8,386,763 B1* | 2/2013 | Spangler | G06F 9/4401 713/2 |
| 9,064,117 B1* | 6/2015 | Worsley | G06F 11/1415 |
| 9,411,646 B2 | 8/2016 | Lei | |
| 2004/0064457 A1* | 4/2004 | Zimmer | G06F 21/575 |

* cited by examiner

*Primary Examiner* — Jaweed A Abbaszadeh
*Assistant Examiner* — Hyun Soo Kim
(74) *Attorney, Agent, or Firm* — IP & T Group LLP

(57) ABSTRACT

A memory system includes: a memory device suitable for storing an encrypted first boot image including first firmware, an encrypted second boot image including second firmware, and a second authentication key for decrypting the encrypted second boot image, and a controller suitable for controlling the memory device and including a boot memory provided with a boot loader and a first authentication key for decrypting the encrypted first boot image, one or more first processing blocks each of which includes a first core, one or more second processing blocks each of which includes a second core, and a buffer memory.

17 Claims, 10 Drawing Sheets

MEMORY SYSTEM AND OPERATION METHOD THEREOF

CROSS-REFERENCE TO RELATED APPLICATION

The present application claims priority of Korean Patent Application No. 10-2018-0112170, filed on Sep. 19, 2018, which is incorporated herein by reference in its entirety.

BACKGROUND

1. Field

Various embodiments of the present invention relate to a memory system, and more particularly, to a memory system for processing data in a memory device and a method of operating the memory system.

2. Description of the Related Art

The computer environment paradigm has been shifting to ubiquitous computing, which enables computer systems to be used anytime and anywhere. As a result, use of portable electronic devices such as mobile phones, digital cameras, and laptop computers has rapidly increased. These portable electronic devices generally use a memory system having a memory device, i.e., a data storage device. A data storage device is used as a main memory device or an auxiliary memory device of a portable electronic device.

The data storage device using a memory device provide excellent stability, durability, high information access speed, and low power consumption, since it has no mechanical driving parts. As for an example of the memory system having such advantages, the data storage device includes a Universal Serial Bus (USB) memory device, a memory card having diverse interfaces, and Solid-State Drives (SSD).

SUMMARY

Embodiments of the present invention are directed to a booting method and apparatus for improving the performance and security of a memory system.

In accordance with an embodiment of the present invention, a memory system includes: a memory device suitable for storing an encrypted first boot image including first firmware, an encrypted second boot image including second firmware, and a second authentication key for decrypting the encrypted second boot image; and a controller suitable for controlling the memory device and including: a boot memory provided with a boot loader and a first authentication key for decrypting the encrypted first boot image, one or more first processing blocks each of which includes a first core, one or more second processing blocks each of which includes a second core, and a buffer memory.

During a booting operation, the one or more first processing blocks may initialize themselves by executing the boot loader to load the encrypted first boot image into the buffer memory, decrypting the encrypted first boot image based on the first authentication key, and driving the first firmware of the decrypted first boot image.

The a select first processing block among the initialized one or more first processing blocks may initialize the one or more second processing blocks by loading the encrypted second boot image and the second authentication key into the buffer memory, decrypting the encrypted second boot image based on the loaded second authentication key, and driving the decrypted second firmware, based on the first firmware.

In accordance with another embodiment of the present invention, a method for operating a memory system provided with a memory device and a controller controlling the memory device includes: executing, by one or more first processing blocks, a boot loader stored in a boot memory of the controller to load an encrypted first boot image from the memory device into a buffer memory of the controller; decrypting, by the one or more first processing blocks, the encrypted first boot image by using a first authentication key stored in the boot memory; driving, by the one or more first processing blocks, a first firmware to initialize the one or more first processing blocks; loading, by a select first processing block, among the initialized one or more first processing blocks, an encrypted second boot image and a second authentication key from the memory device into the buffer memory based on the first firmware; decrypting, by the select first processing block, the encrypted second boot image by using the loaded second authentication key based on the first firmware; and initializing, by the select first processing block, one or more second processing blocks by driving a second firmware included in the decrypted second boot image based on the first firmware.

In accordance with still another embodiment of the present invention, a memory system comprising: a storage device suitable for storing an encrypted boot image containing at least a primary portion and a secondary portion and storing a secondary authentication key for authenticating the secondary part; a memory suitable for storing a primary authentication key for authenticating the primary portion; at least one secondary processing block; and at least one primary processing block suitable for sequentially booting, when the memory system is powered on, itself and the at least one secondary processing block respectively by authenticating the encrypted boot image through the primary and secondary authentication keys, decrypting the authenticated boot image and driving the decrypted boot image, wherein the booted primary and secondary processing blocks controls the memory system according to firmware in the decrypted boot image.

DETAILED DESCRIPTION

Figure 1:
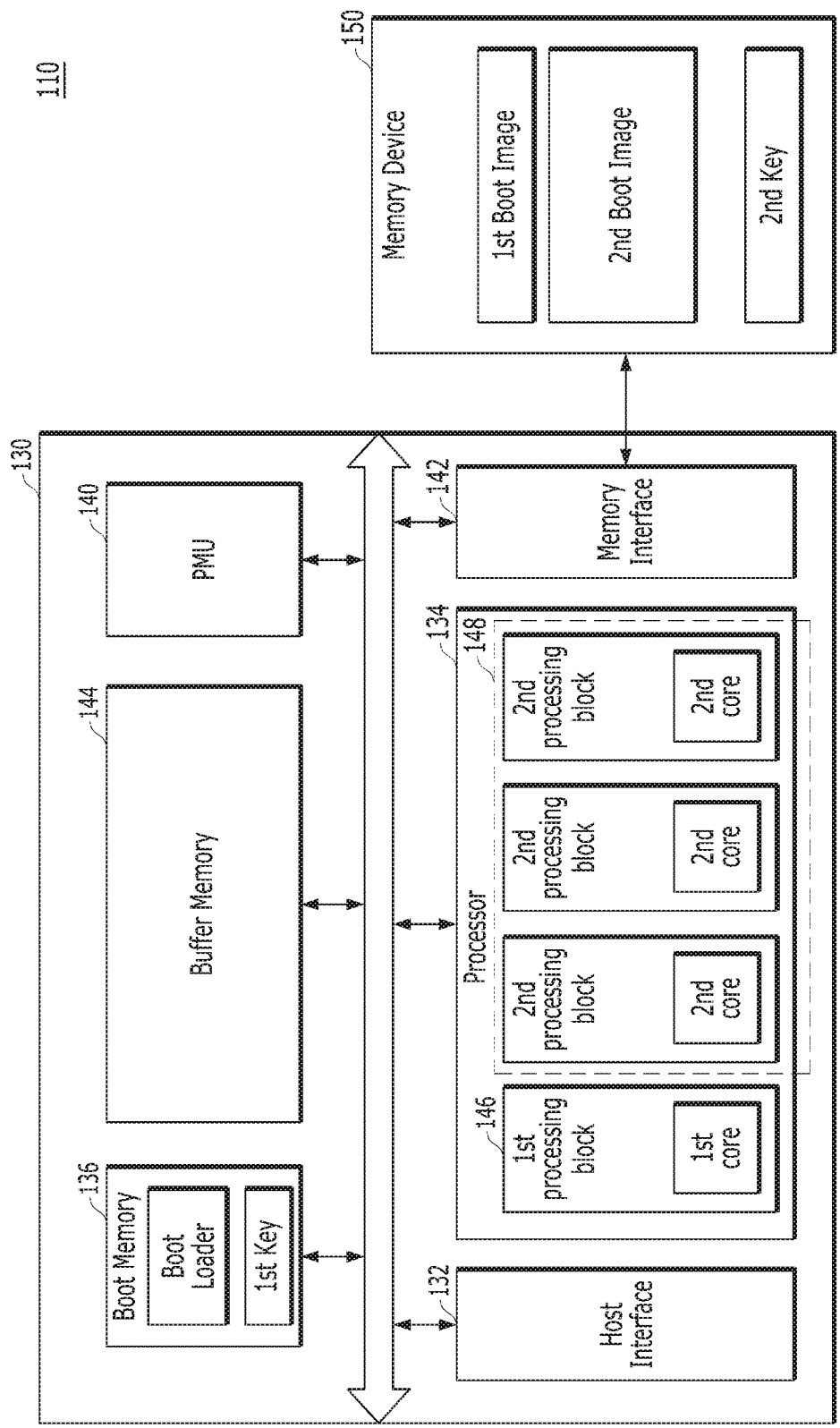
FIG. 1 is a block diagram illustrating a memory system in accordance with an embodiment of the present invention.

Various embodiments of the present invention will be described below in more detail with reference to the accompanying drawings. The present invention may, however, be embodied in different configurations or arrangements than disclosed herein. Thus, the present invention is not limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element that otherwise have the same or similar names. For instance, a first element in one context could be termed a second element in another context, or vice versa, without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way. Communication between two elements, whether directly or indirectly connected/coupled, may be wired or wireless, unless the context indicates otherwise.

The terminology used herein is for the purpose of describing particular embodiments only and is not intended to be limiting. In the present disclosure, the singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The embodiments disclosed herein are for the purpose of understanding the technical spirit of the present disclosure. However, the scope of the present disclosure should not be limited to these embodiments. Those skilled in the art to which the present disclosure pertains will understand and recognize in light of the technical spirit of the present disclosure as well as the disclosed embodiments that modifications may be made.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Various embodiments of the present invention will be described in detail with reference to the attached drawings.

FIG. 1 is a block diagram illustrating a memory system 110 in accordance with an embodiment of the present invention.

The memory system 110 may operate to store data for the host in response to a request of the host. The memory system 110 may be used as a main memory device or an auxiliary memory device of a host.

The host may include any of various portable electronic devices such as a mobile phone, MP3 player and laptop computer, or any of various non-portable electronic devices such as a desktop computer, a game machine, a television (TV), and a projector.

The host may include at least one operating system (OS), which may manage and control overall functions and operations of the host, and provide operation between the host and a user using the memory system 110. The OS may support functions and operations corresponding to the use purpose and usage of a user.

The memory system 110 may operate to store data for the host in response to a request of the host. Non-limiting examples of the memory system 110 include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory.

The memory system 110 may include a controller 130 and a memory device 150.

The controller 130 and the memory device 150 may be integrated into a single semiconductor device, which may be included in any of the various types of memory systems exemplified above. For example, the controller 130 and the memory device 150 may be integrated as one semiconductor device to constitute a solid state drive (SSD). When the memory system 110 is used as an SSD, the operating speed of the host connected to the memory system 110 can be improved. In another example, the controller 130 and the memory device 150 may be integrated as one semiconductor device to constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host through a write operation, and provide data stored therein to the host through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host. For example, the controller 130 may provide data read from the memory device 150 to the host, and store data provided from the host into the memory device 150. For this operation, the controller 130 may control read, write, program and erase operations of the memory device 150.

The controller 130 may include a host interface (I/F) 132, a processor 134, an error correction code (ECC) component, a Power Management Unit (PMU) 140, a memory I/F 142 such as a NAND flash controller (NFC), and a memory 144, all operatively coupled via an internal bus.

The host interface 132 may be configured to process a command and data of the host, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface may drive firmware to support data transfer between the host and the controller 130. The firmware may be referred to as host interface layer (HIL).

The PMU 140 may provide and manage power of the controller 130.

The memory I/F 142 may serve as a memory/storage interface for interfacing the controller 130 and the memory device 150 such that the controller 130 controls the memory device 150 in response to a request from the host. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may drive a firmware to support data transfer between the controller 130 and the memory device 150. The firmware may be referred to as flash interface layer (FIL).

The buffer memory 144 may serve as a working memory of the memory system 110 and the controller 130, and store data for driving the memory system 110 and the controller 130.

The buffer memory 144 may be embodied by a volatile memory. For example, the buffer memory 144 may be embodied by static random access memory (SRAM) or dynamic random access memory (DRAM). The buffer memory 144 may be disposed within or externally to the controller 130. FIG. 1 shows the buffer memory 144 disposed within the controller 130. In an embodiment, the buffer memory 144 may be embodied by an external volatile memory having a memory interface transferring data between the buffer memory 144 and the controller 130.

The controller 130 may control the memory device 150 to perform read, write, program and erase operations in response to a request from the host. The controller 130 may provide data read from the memory device 150 to the host, may store data provided from the host into the memory device 150. The buffer memory 144 may store data required for the controller 130 and the memory device 150 to perform these operations. In order to store data required for the controller 130 and the memory device 150, the buffer memory 144 may include a write buffer, a read buffer, a data buffer, and a map buffer.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

Referring to FIG. 1, the processor 134 may include a plurality of processing blocks. Each of the processing blocks may include a core for processing operations and a memory (not shown) for storing data needed for the operation of the core.

For example, the controller 130 may perform an operation requested by the host in the memory device 150 through the processor 134, which is realized as a microprocessor or a CPU. In other words, the controller 130 may perform a command operation corresponding to a command received from the host, or other source. The controller 130 may perform a foreground operation as the command operation corresponding to the command received from the host. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation on the memory device 150 through the processor 134, which is realized as a microprocessor or a CPU. The background operation performed on the memory device 150 may include an operation of copying and processing data stored in some memory blocks among the memory blocks of the memory device 150 into other memory blocks, e.g., a garbage collection (GC) operation, an operation of swapping data between select memory blocks, e.g., a wear-leveling (WL) operation, an operation of storing the map data stored in the controller 130 in the memory blocks, e.g., a map flush operation, or an operation of managing bad blocks of the memory device 150, e.g., a bad block management operation of detecting and processing bad blocks among the memory blocks.

Meanwhile, when the memory system 110 is powered up, the buffer memory 144 may not store data for driving the memory system 110. Processor 134 may load the data for driving the memory system 110 from memory device 150, and store the data in the buffer memory 144. The data for driving the memory system 110 is referred to as a boot image.

The memory device 150 may store a boot image. The boot image may include firmware and data required for driving the firmware. The firmware may be executed by a processor 134, which will be described later, and may include commands needed for the operations of the memory system 110. For example, the firmware may control at least one among the host interface 132, the processor 134, the power management unit 140, and the memory interface 142.

Also, the boot memory 136 may store data required for booting the memory system 110. To be specific, the boot memory 136 may include a boot loader and an authentication, e.g., $1^{st}$ key. The boot memory 136 may maintain the data even though power is not supplied.

When the memory system 110 is powered up, the processor 134 may load the boot image into the buffer memory 144 in response to a command provided from the boot loader. The boot loader may include source code corresponding to a command for controlling the memory device 150 to read the boot image stored therein to load the boot image into the buffer memory 144.

The boot image may be damaged by a malicious and unauthorized access such as data hacking or the like. The memory system 110 may perform a security booting of authenticating the boot image through the authentication key stored in the boot memory 136 so as not to boot the memory system 110 through a damaged boot image.

As the demand for a high-performance memory system increases, the performance of the processor 134 constituting the memory system 110 may be improved, and there may be many kinds of such firmware driven by the processor. For example, each of the processing blocks described above may drive power management firmware controlling the PMU 140 and at least one among plural pieces of firmware such as the HIL, FIL, and FTL described above. Therefore, the boot image stored in the memory device 150 may include plural pieces of firmware, and the size of the boot image may increase.

In the memory system according to the prior art, the processor loads all the large-capacity boot images for driving plural pieces of firmware into a memory of the controller in response to a command provided from the boot loader and performs authentication on the entire boot images by using the authentication key included in the boot memory.

The boot memory storing the boot loader and the authentication key has a low operation speed. Therefore, it takes more time to provide a command from the boot loader to load and authenticate a large-size boot image. Also, since the data stored once in the boot memory cannot be modified, the security of the memory system according to the prior art may be vulnerable when the authentication key is leaked out.

According to an embodiment of the present invention, the processor 134 may include one or more first processing blocks that are securely booted in response to a command of the boot loader and one or more second processing blocks that are securely booted under the control of the booted one or more first processing blocks. FIG. 1 illustrates the processor 134 that includes one first processing block 146 and a plurality of second processing blocks 148.

According to an embodiment of the present invention, the boot memory 136 may include a boot loader for loading an encrypted first boot image stored in the memory device 150 and a first authentication key for authenticating the first boot image. The first boot image may include the first firmware as part of the entire boot image and may further include source code, which may be commands and data, for loading the second firmware from the memory device 150 into the buffer memory 144.

According to an embodiment of the present invention, the memory device 150 may include the encrypted first boot image, an encrypted second boot image, and a second authentication key for authenticating the encrypted second boot image. The second boot image may include the second firmware.

According to an embodiment of the present invention, the booting operation of the memory system 110 may be improved independently of the limited resources of the boot memory 136, by additionally using the resources of the memory device 150 and one or more first processing blocks 146. Further, security for the boot image may be enhanced by using a plurality of authentication keys.

FIG. 1 illustrates that the second authentication key is stored in the memory device 150 in a region different from the region where the encrypted first and second boot images are stored. However, the present invention is not limited to this arrangement. In another embodiment, the second authentication key may be included in the encrypted first boot image.

Figure 2:
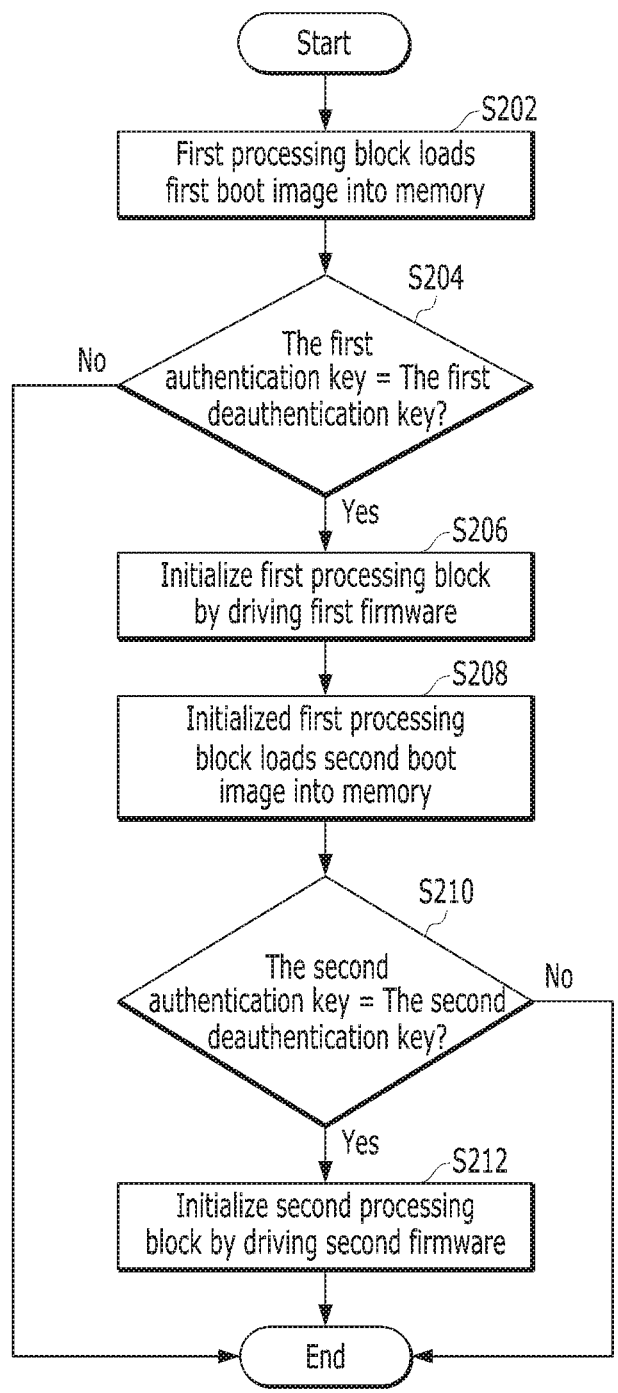
FIGS. 2 to 3B illustrate a booting operation of the memory system in accordance with an embodiment of the present invention.
Figure 3A:
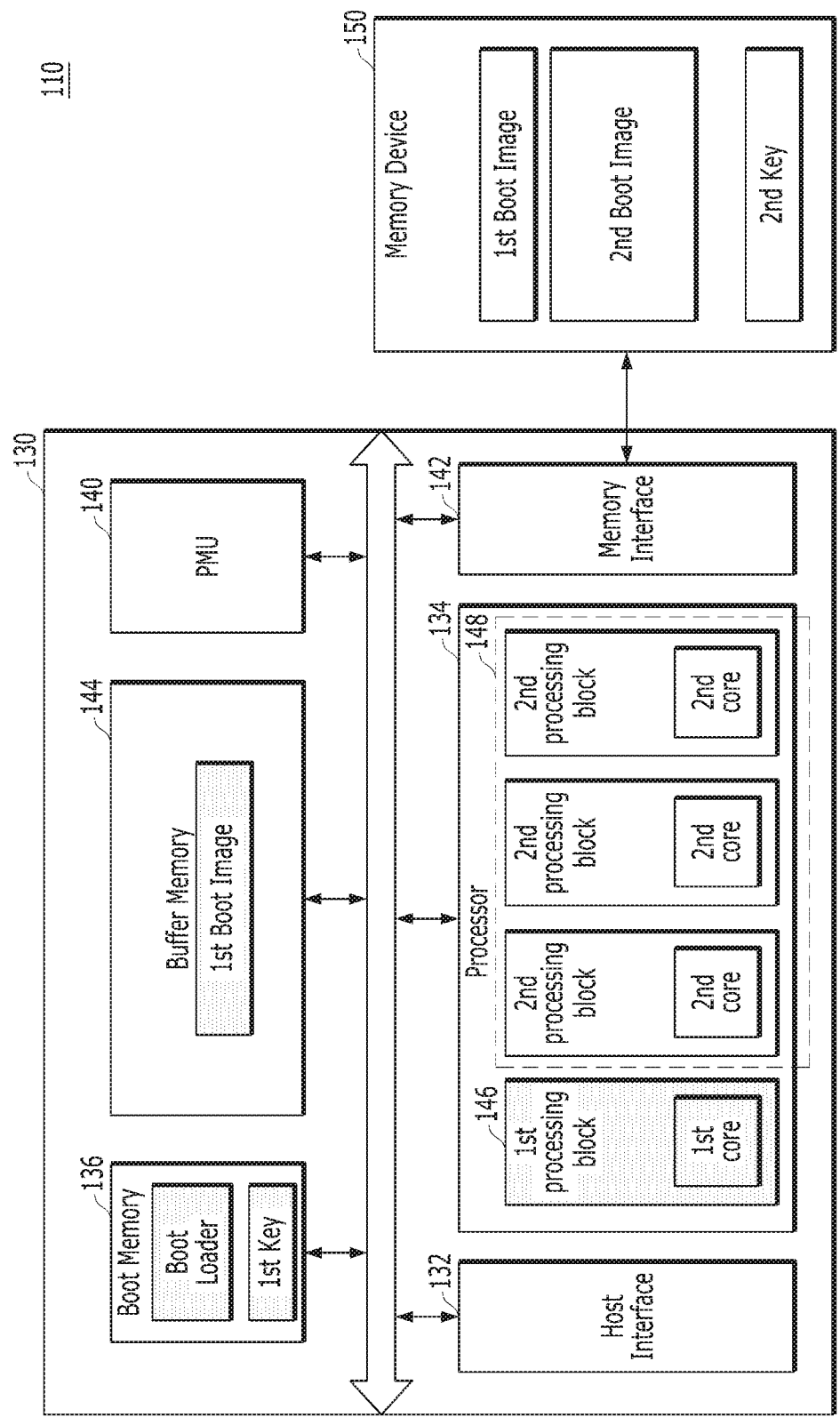
Figure 3B:
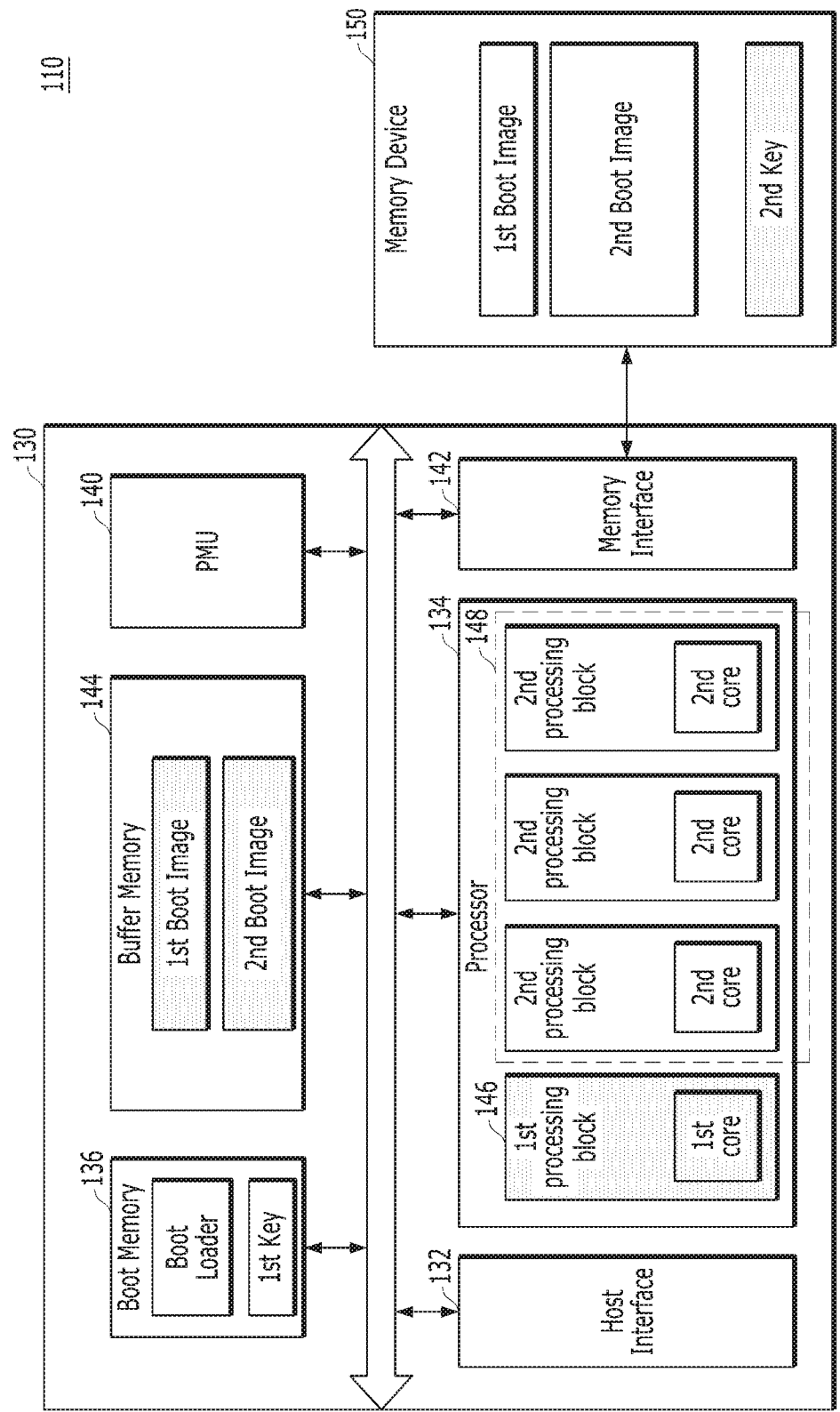

FIGS. 2 to 3B illustrate a booting operation of the memory system in accordance with an embodiment of the present invention.

Referring to FIG. 2, when the memory system 110 is powered on, the first processing block 146 may execute the boot loader stored in the boot memory 136 in step S202. The first processing block 146 may load the encrypted first boot image from the memory device 150 into the buffer memory 144 in response to a command provided from the boot loader.

In step S204, the first processing block 146 may decrypt the encrypted first boot image by using the first authentication key stored in the boot memory 136.

In an embodiment of the present invention, the encrypted first boot image may also include the first authentication key. The first processing block 146 may extract the first authentication key and decrypt the first boot image by comparing the first authentication keys. When the encrypted first boot image stored in the memory device 150 is damaged and thus the first authentication key therein is also damaged, the first processing block 146 may not decrypt the damaged first boot image loaded from the memory device 150 since the first authentication key stored in the boot memory 136 is different from the damaged first authentication key in the damaged first boot image.

In an embodiment of the present invention, the first processing block 146 may perform a set operation to extract the first authentication key from the first boot image. The first processing block 146 may decrypt the first boot image by comparing the extracted first authentication key with the first authentication key stored in the boot memory 136. The boot memory 136 may further include source code, which may be commands and data, for the set operation.

When the encrypted first boot image is damaged, the first authentication keys do not coincide with each other, e.g., do not match. When the first authentication keys do not coincide with each other ("No" in the step S204), the first processing block 146 may end the booting operation without decryption of the first boot image.

When the first authentication keys coincide with each other ("Yes" in the step S204), the first processing block 146 may decrypt the first boot image and perform a booting operation for itself in response to a command provided from the first boot image in step S206. To be specific, the booting operation of the first processing block 146 may include initiating the first processing block 146 by driving the first firmware included in the first boot image. When the operation of initializing the first processing block 146 is completed, the first processing block 146 may operate by itself under the control of the first firmware.

The initialized first processing block 146 may control the operation of the memory system 110 based on the first firmware. For example, when the first firmware is the power management firmware, the first processing block 146 may manage the power supply of the memory system 110 by controlling the power management unit (PMU) 140.

The first processing block 146 which is driven by the first firmware may not be sufficient to control the overall operation of the memory system 110. However, the initialized first processing block 146 may operate on its own without depending on the command from the boot loader of the boot memory 136. For example, the first processing block 146 may operate by itself based on the first firmware to provide the memory device 150 with a command for reading a data stored in the memory device 150.

FIG. 3A illustrates a state that the encrypted first boot image is loaded into the buffer memory 144. The shaded areas shown in FIG. 3A may represent a region where the operations of the step S202 to S206 are performed.

Referring back to FIG. 2, in step S208, the initialized first processing block 146 may load the encrypted second boot image from the memory device 150 into the buffer memory 144 in response to a command in the first boot image.

The initialized first processing block 146 obtained in the step S210 may decrypt the encrypted second boot image by using the second authentication key stored in the memory device 150.

According to an embodiment of the present invention, the encrypted second boot image may also include the second authentication key. The booted first processing block 146 may extract the second authentication key from the second boot image and decrypt the second boot image by comparing the second authentication key extracted from the encrypted second boot image with the second authentication key loaded from the memory device 150.

According to an embodiment of the present invention, the booted first processing block 146 may perform a set operation to extract the second authentication key from the encrypted second boot image. The booted first processing block 146 may decrypt the second boot image by comparing the extracted second authentication key with the second authentication key loaded from the memory device 150. The boot memory 136 may further include source code, which may be commands and data, for performing the set operation.

FIG. 3B illustrates a state where the encrypted second boot image is loaded into the buffer memory 144. The shaded areas shown in FIG. 3B may represent a region where the operations of the steps S208 to S210 are performed.

When the encrypted second boot image is damaged, the second authentication key extracted from the damaged second boot image and the second authentication key loaded from the memory device 150 do not coincide with each other. When the second authentication keys do not coincide with each other ("No" in the step S210), the initialized first processing block 146 may end the booting operation without decrypting the damaged second boot image.

When the second authentication keys coincide with each other ("Yes" in the step S210), the initialized first processing block 146 may decrypt the encrypted second boot image and perform a booting operation on one or more second processing blocks 148 in response to the command in the second boot image in step S212. To be specific, the booting operation for the second processing block 148 may include an operation of initializing the second processing block 148 by driving the second firmware included in the decrypted second image. When the operation of initializing the second processing block 148 is completed, the second processing block 148 may operate by itself under the control of the second firmware.

According to an embodiment of the present invention, the second boot image loaded into the buffer memory 144 may be encrypted and encoded. When the encrypted and encoded second boot image is decrypted, the initialized first processing block 146 may decode the encoded second boot image and perform a booting operation on the one or more second processing blocks 148 by reading the decoded second boot image. The first boot image may further include source code, which may be commands and data, for decoding the second boot image.

The one or more second processing blocks 148 on which the booting operation is completed may control the operations of the memory system 110 by individually driving the second firmware. The second firmware may refer to a firmware other than the first firmware among plural pieces of firmware required to control the overall operations of the memory system 110. For example, when the first firmware is the power management firmware, the second firmware may be HIL, FIL, or FTL. However, the present invention is not limited to these kinds of first firmware and second firmware.

When the operation of the step S212 is completed, the operation of initializing the first processing block 146 and the second processing block 148 may all be completed and thus each of the first and second processing blocks may operate by itself under the control of the first firmware and the second firmware. Thus, the processor 134 may be able to control the overall operations of the memory system 110.

Although FIG. 1 illustrates the memory system 110 where one first processing block 146 is booted in response to the command of the boot loader and multiple second processing blocks 148 are booted under the control of the booted first processing block 146, the concept and spirit of the present invention are not limited to that arrangement and configuration.

Figure 4:
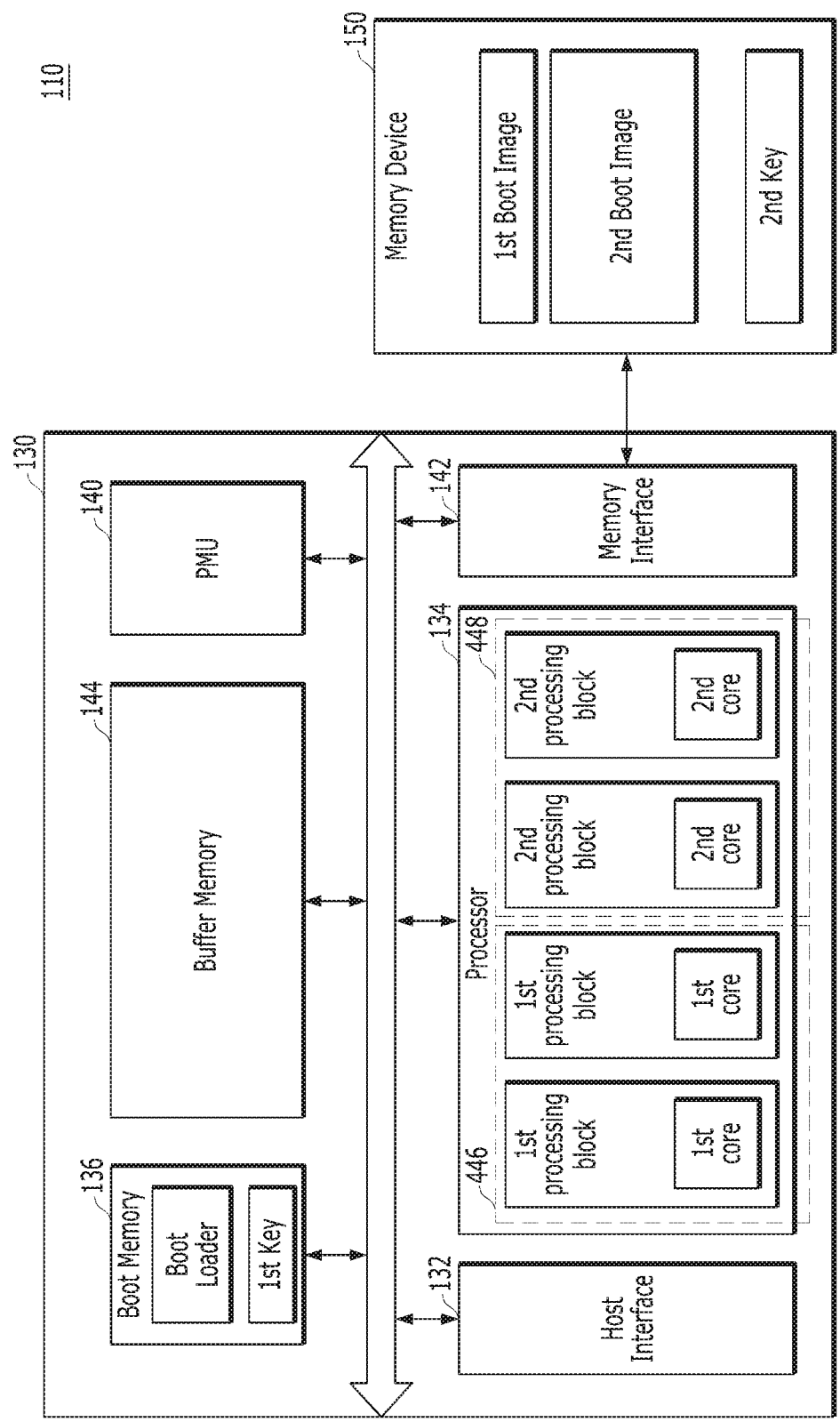
FIG. 4 is a block diagram illustrating a structure of a memory system in accordance with an embodiment of the present invention.

FIG. 4 is a block diagram illustrating a structure of the memory system 110 in accordance with an embodiment of the present invention.

Referring to FIG. 4, a plurality of first processing blocks 446 may be booted in response to a command of a boot loader. The booted first processing blocks 446 may operate under the control of different pieces of first firmware, respectively. The booted first processing blocks 446 may operate in parallel to boot a plurality of second processing blocks 448.

According to embodiments of the present invention, the booted first processing blocks 446 may include a load block and an authentication block. As soon as, or immediately after, the load block loads the encrypted second boot image in the step S208, the authentication block may extract a second authentication key by performing a set operation on a portion of the second boot image, which is already loaded, in order to extract an authentication key of the encrypted second boot image.

According to embodiments of the present invention described above, the booting operation of the memory system 110 may be improved by additionally using the resources of the memory device 150 and one or more first processing blocks 146 even when the resource of the boot memory 136 is limited.

Also, when the boot memory 136 is formed of a read-only memory device, it may be difficult to change data once it is stored. On the other hand, the memory device 150 is a non-volatile memory device such as a flash memory that may change the stored data. Therefore, even though the second authentication key is leaked out, the second authentication key may be changed relatively easily because the second authentication key is stored in a key storage area in the memory device 150. Thus, the security of the memory system 110 may be improved.

With reference to FIGS. 5 to 13, a data processing system and electronic devices to which the memory system 110 including the memory device 150 and the controller 130 described above may be applied will be described in detail.

Figure 5:
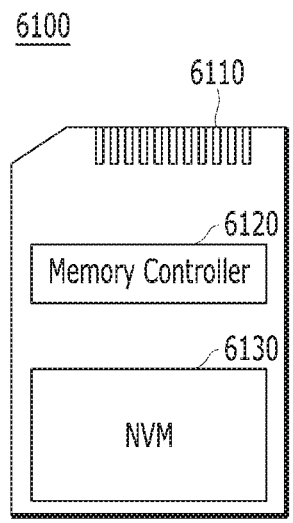
FIGS. 5 to 13 illustrate other examples of a data processing system including the memory system in accordance with embodiments of the present invention.

FIG. 5 is a diagram schematically illustrating the data processing system including the memory system in accordance with an embodiment. FIG. 5 schematically illustrates a memory card system 6100 to which the memory system in accordance with an embodiment is applied.

Referring to FIG. 5, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system may be applied to wired and/or wireless electronic devices, particularly mobile electronic devices.

The memory device 6130 may be implemented by a nonvolatile memory (NVM). For example, the memory device 6130 may be implemented by any of various non-volatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). In another embodiment, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and/or a universal flash storage (UFS).

Figure 6:
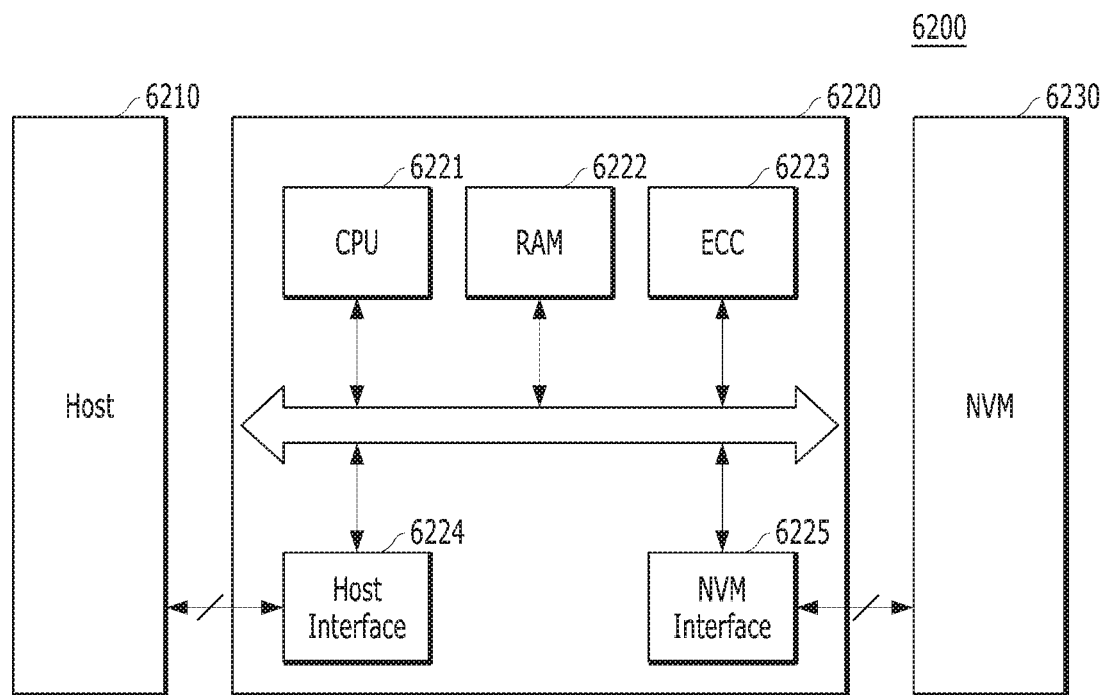

FIG. 6 is a diagram schematically illustrating another example of a data processing system 6200 including the memory system in accordance with an embodiment.

Referring to FIG. 6, the data processing system 6200 may include a memory device 6230 having one or more non-volatile memories (NVMs) and a memory controller 6220 for controlling the memory device 6230. The data processing system 6200 may serve as a storage medium such as a memory card (CF card, SD card, micro-SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system may be applied to wired and/or wireless electronic devices, particularly a mobile electronic device.

Figure 7:
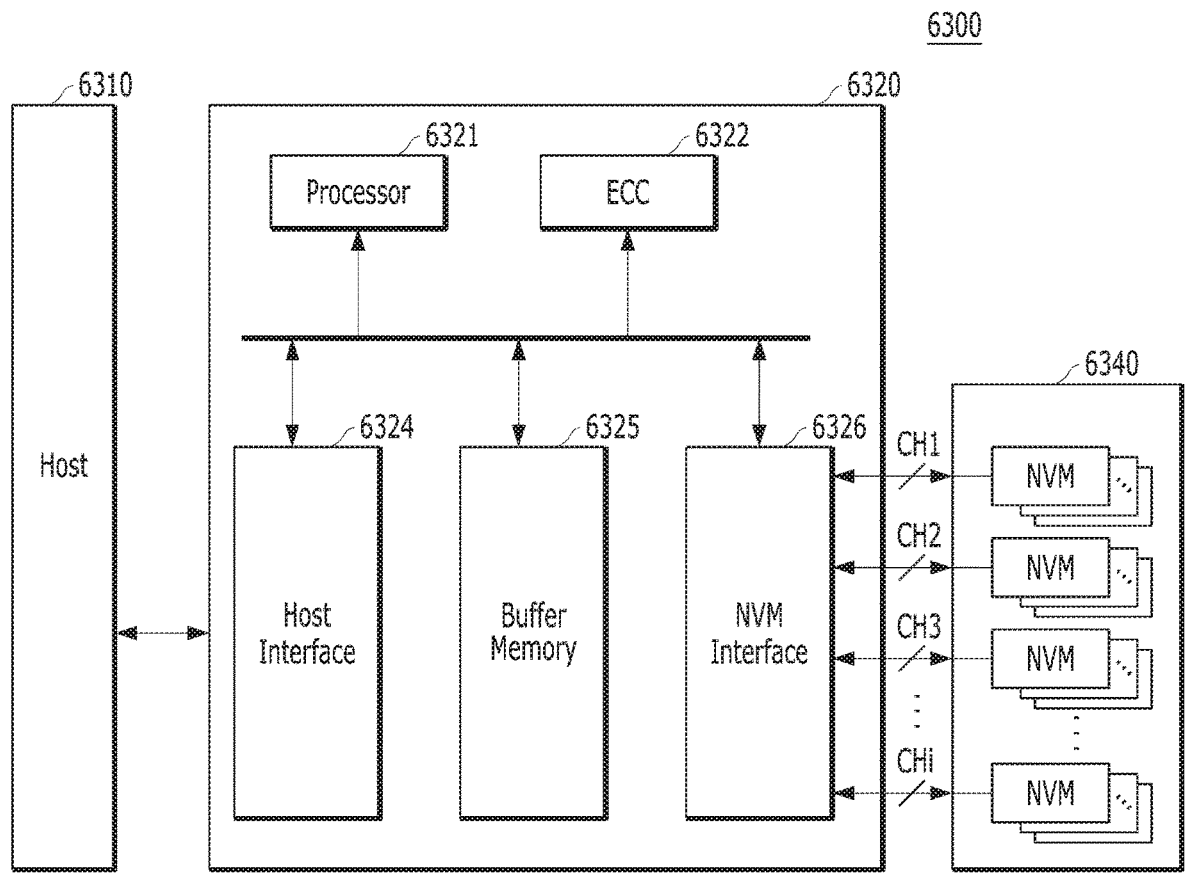

FIG. 7 is a diagram schematically illustrating another example of the data processing system including the memory system in accordance with an embodiment. FIG. 7 schematically illustrates a solid state drive (SSD) 6300 to which the memory system may be applied.

Referring to FIG. 7, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). By way of example, FIG. 7 illustrates that the buffer memory 6325 exists in the controller 6320. However, the buffer memory 6325 may be disposed externally to the controller 6320.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 8:
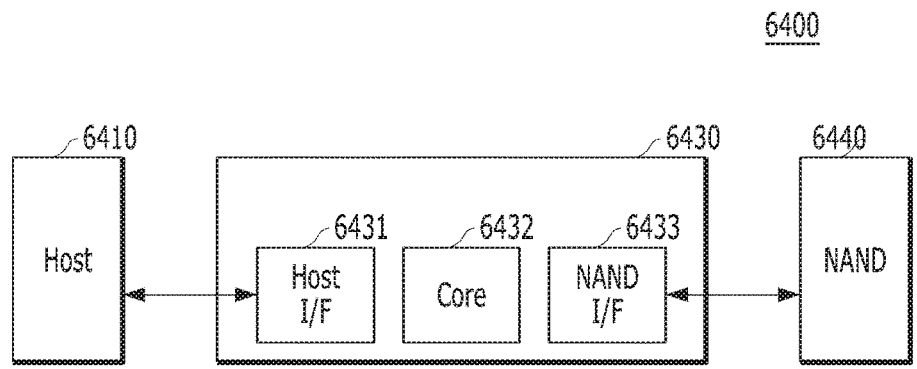

FIG. 8 is a diagram schematically illustrating another example of the data processing system including the memory system in accordance with an embodiment. FIG. 8 schematically illustrates an embedded Multi-Media Card (eMMC) 6400 to which the memory system may be applied.

Referring to FIG. 8, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

Each of the memory controller 6120, the memory controller 6220, the controller 6320, and the controller 6430 described in FIGS. 5 to 8 may include a boot memory including a boot loader and a first authentication key, a first processing block, and a second processing block. The memory device 6130, the memory device 6230, the memory device 6340, and the memory device 6440 may include a first boot image, a second boot image, and a second authentication key.

The first processing block may load the first boot image in response to the control of the boot loader to boot itself. The booted first processing block may boot the second processing block by loading the second boot image and the second authentication key. In other words, the booting performance of the memory system may be improved by additionally utilizing the resources of the first processing block, and the security may be enhanced by using a plurality of authentication keys.

FIGS. 9 to 12 are diagrams schematically illustrating other examples of the data processing system including the memory system in accordance with one or more embodiments. FIGS. 9 to 12 schematically illustrate universal flash storage (UFS) systems to which the memory system may be applied.

Referring to FIGS. 9 to 12, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 6 to 8, and the UFS cards 6530, 6630, 6730 and 6830 may be embodied in the form of the memory card system 6100 described with reference to FIG. 5.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal serial bus (USB) Flash Drives (UFDs), multi-media card (MMC), secure digital (SD), mini-SD card, and micro-SD card.

Figure 9:
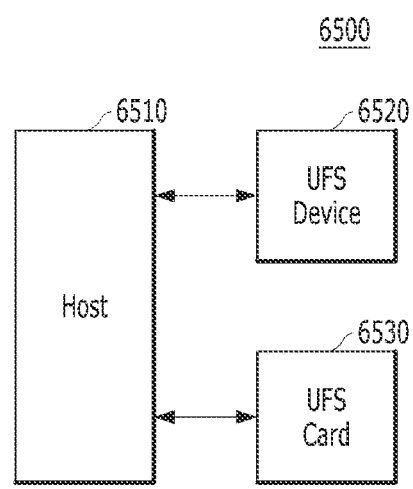

In the UFS system 6500 illustrated in FIG. 9, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, the configuration in which one UFS device 6520 and one UFS card 6530 are connected to the host 6510 is shown by way of example. However, in another embodiment, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 10:
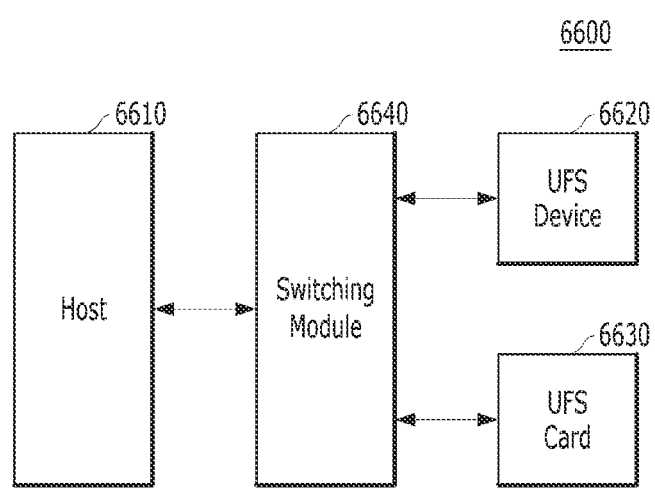

In the UFS system 6600 illustrated in FIG. 10, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, the configuration in which one UFS device 6620 and one UFS card 6630 are connected to the switching module 6640 is shown by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 11:
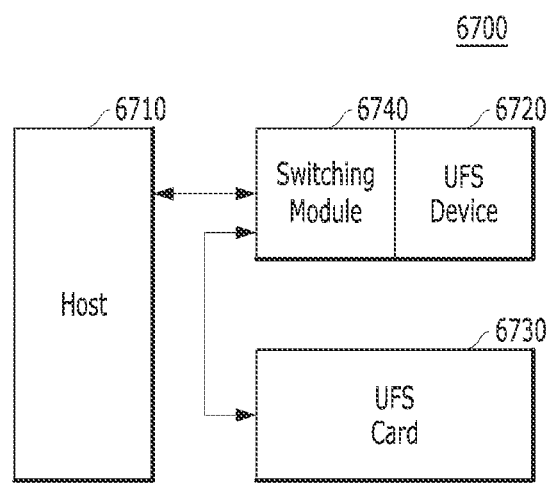

In the UFS system 6700 illustrated in FIG. 11, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the illustrated embodiment, the configuration in which one UFS device 6720 and one UFS card 6730 are connected to the switching module 6740 is shown by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 12:
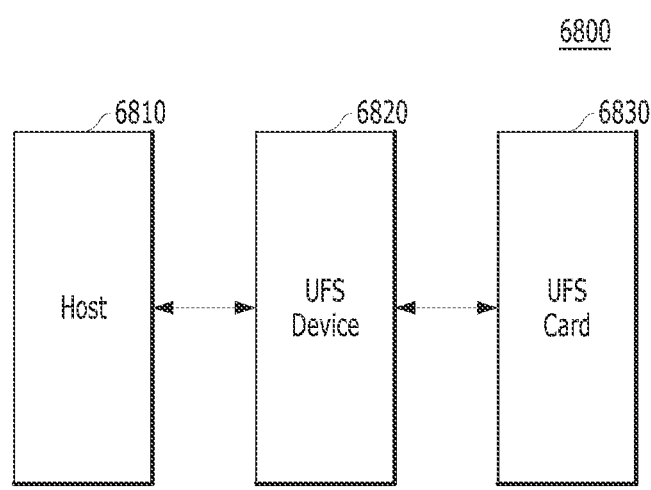

In the UFS system 6800 illustrated in FIG. 12, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In the illustrated embodiment, the configuration in which one UFS device 6820 is connected to the host 6810 and one UFS card 6830 is connected to the UFS device 6820 is shown by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 13:
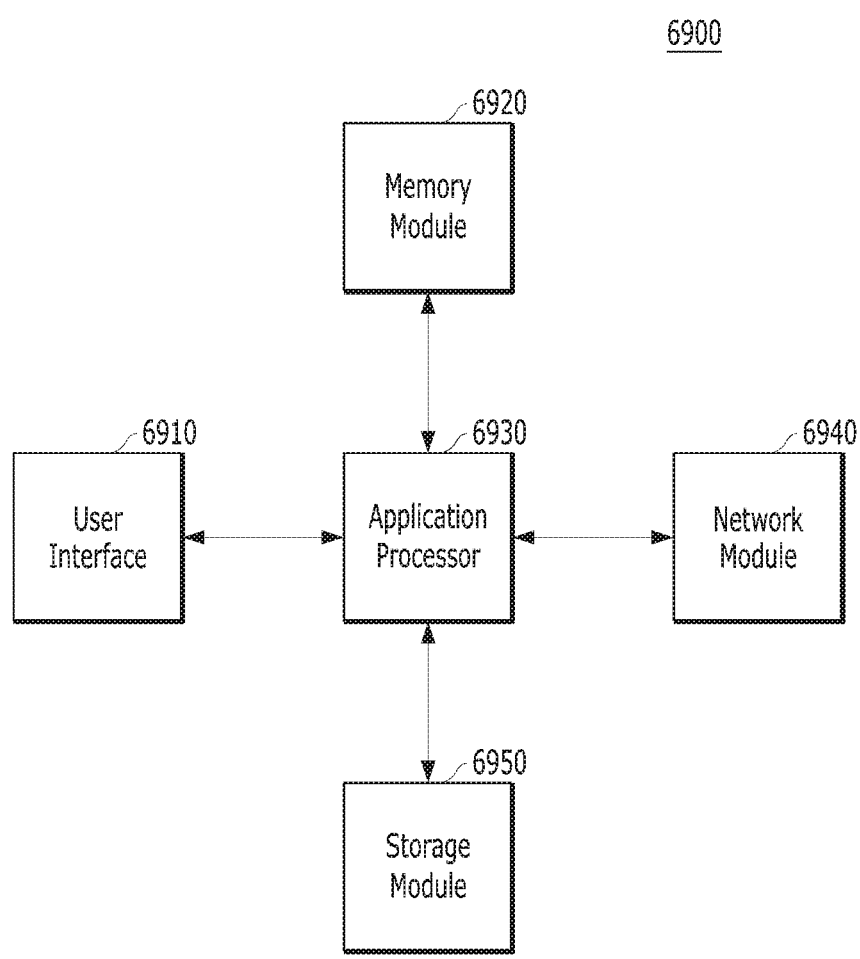

FIG. 13 is a diagram schematically illustrating another example of the data processing system including the memory system in accordance with an embodiment. FIG. 13 is a diagram schematically illustrating a user system 6900 to which the memory system may be applied.

Referring to FIG. 13, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 7 to 12.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

According to embodiments of the present invention, a booting method and apparatus that may improve the performance and security of a memory system are provided.

While the present invention has been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
 a memory device suitable for storing an encrypted first boot image including first firmware, an encrypted second boot image including second firmware, and a second authentication key for decrypting the encrypted second boot image; and
 a controller suitable for controlling the memory device and including:
  a boot memory provided with a boot loader and a first authentication key for decrypting the encrypted first boot image,
  a buffer memory,
  one or more first processing blocks suitable for initializing themselves by executing the boot loader to load the encrypted first boot image from the memory device into the buffer memory, decrypting the encrypted first boot image based on the first authentication key, and driving the first firmware of the decrypted first boot image, and
  one or more second processing blocks,
  wherein a select first processing block, among the initialized one or more first processing blocks, initializes the one or more second processing blocks by loading the encrypted second boot image and the second authentication key into the buffer memory, decrypting the encrypted second boot image based on the loaded second authentication key, and driving the decrypted second firmware, based on the first firmware.

2. The memory system of claim 1,
 wherein the encrypted first boot image includes the first authentication key, and
 wherein the one or more first processing blocks decrypt the encrypted first boot image according to a first result of comparison between the first authentication key of the encrypted first boot image and the first authentication key of the boot memory.

3. The memory system of claim 2, wherein a select first processing block, among the one or more first processing blocks, extracts the first authentication key from the encrypted first boot image by performing a set operation.

4. The memory system of claim 2, wherein the one or more first processing blocks end an operation, when the first result of comparison reveals that the first authentication key of the encrypted first boot image and the first authentication key of the boot memory do not coincide with each other.

5. The memory system of claim 1,
 wherein the encrypted second boot image includes the second authentication key, and
 wherein the select first processing block decrypts the encrypted second boot image according to a second result of comparison between the second authentication key of the encrypted second boot image and second authentication key of the memory device.

6. The memory system of claim 5, wherein the select first processing block extracts the second authentication key by performing a set operation on the encrypted second boot image.

7. The memory system of claim 5, wherein the select first processing block ends an operation when the second result of comparison reveals that the second authentication key of the encrypted second boot image and second authentication key of the memory device do not coincide with each other.

8. The memory system of claim 1,
 wherein each of the initialized first processing blocks includes a load block and an authentication block, and
 wherein, after the load block loads the encrypted second boot image and the second authentication key into the buffer memory based on the first firmware, the authentication block extracts a second authentication key by performing a set operation on a portion of the second boot image, which is already loaded, decrypts the encrypted second boot image by comparing the extracted second authentication key with the second authentication key of the buffer memory, and drives the second firmware of the decrypted second boot image.

9. The memory system of claim 1, wherein the second authentication key is included in the encrypted first boot image.

10. A method for operating a memory system provided with a memory device and a controller controlling the memory device, comprising:

executing, by one or more first processing blocks, a boot loader stored in a boot memory of the controller to load an encrypted first boot image from the memory device into a buffer memory of the controller;

decrypting, by the one or more first processing blocks, the encrypted first boot image by using a first authentication key stored in the boot memory;

driving, by the one or more first processing blocks, first firmware to initialize themselves;

loading, by a select first processing block, among the initialized one or more first processing blocks, an encrypted second boot image and a second authentication key from the memory device into the buffer memory based on the first firmware;

decrypting, by the select first processing block, the encrypted second boot image by using the loaded second authentication key based on the first firmware; and initializing, by the select first processing block, one or more second processing blocks by driving a second firmware included in the decrypted second boot image based on the first firmware.

11. The method of claim 10, wherein the decrypting of the encrypted first boot image includes:

extracting the first authentication key from the encrypted first boot image; and decrypting the encrypted first boot image according to a first result of comparison between the first authentication key of the encrypted first boot image and the first authentication key of the boot memory.

12. The method of claim 11, wherein the extracting of the first authentication key includes:

extracting the first authentication key by performing a set operation on the encrypted first boot image.

13. The method of claim 11, wherein the decrypting of the encrypted first boot image further include sending an operation when the first result of comparison reveals that the first authentication key of the encrypted first boot image and the first authentication key of the boot memory do not coincide with each other.

14. The method of claim 10, wherein the decrypting of the encrypted second boot image includes:

extracting the second authentication key from the encrypted second boot image; and decrypting the encrypted second boot image according to a second result of comparison between the second authentication key of the encrypted second boot image with the second authentication key of the memory device with the second authentication key.

15. The method of claim 14, wherein the extracting of the second authentication key includes:

extracting the second authentication key by performing a set operation.

16. The method of claim 14, wherein the decrypting of the encrypted second boot image further includes ending an operation when the second result of comparison reveals that the second authentication key of the encrypted second boot image with the second authentication key of the memory device do not coincide with each other.

17. A memory system comprising:

a storage device suitable for storing an encrypted boot image containing at least a primary portion and a secondary portion and storing a secondary authentication key for authenticating the secondary portion;

a memory suitable for storing a primary authentication key for authenticating the primary portion;

at least one secondary processing block; and at least one primary processing block suitable for sequentially booting, when the memory system is powered on, itself and the at least one secondary processing block respectively by authenticating the encrypted boot image through the primary and secondary authentication keys, decrypting the authenticated boot image and driving the decrypted boot image, wherein the booted primary and secondary processing blocks controls the memory system according to firmware in the decrypted boot image.

* * * * *